March 28, 1950 W. MAKENNY 2,502,227
BASE PIN FEED
Filed March 1, 1945 3 Sheets-Sheet 1
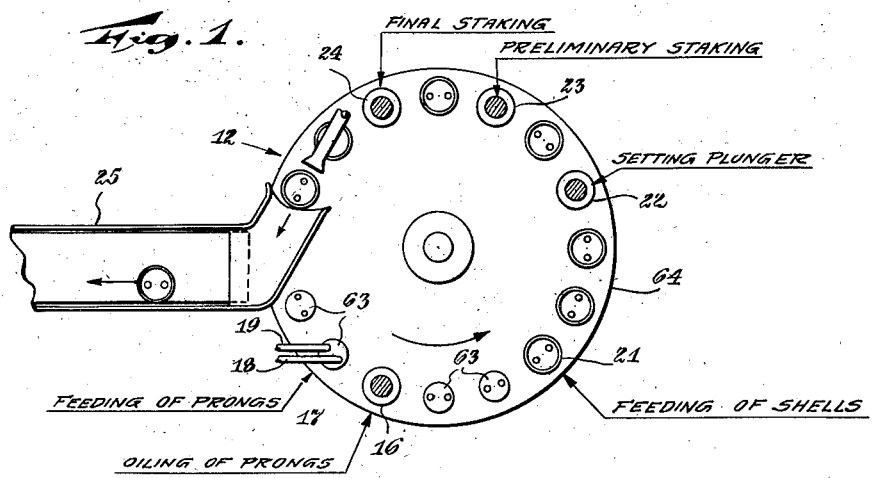
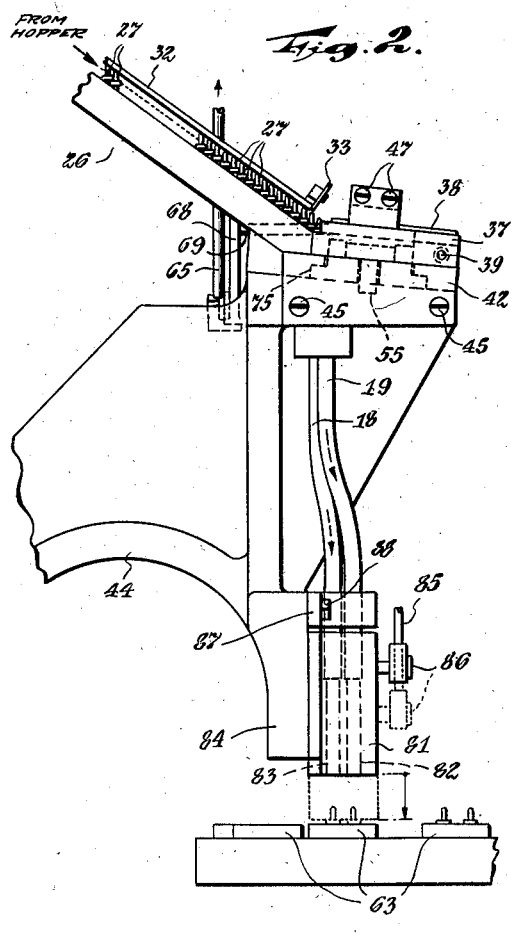
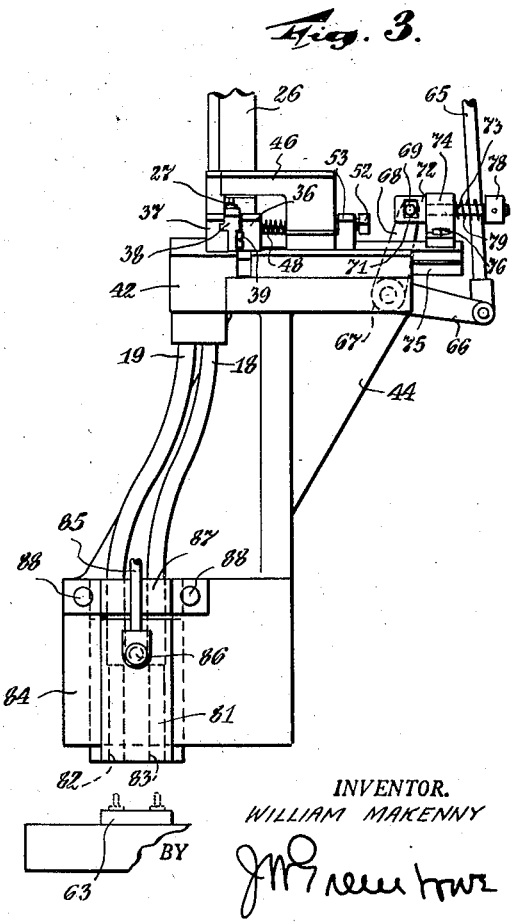
INVENTOR.
WILLIAM MAKENNY
BY
ATTORNEY.

March 28, 1950 W. MAKENNY 2,502,227
BASE PIN FEED
Filed March 1, 1945 3 Sheets-Sheet 2
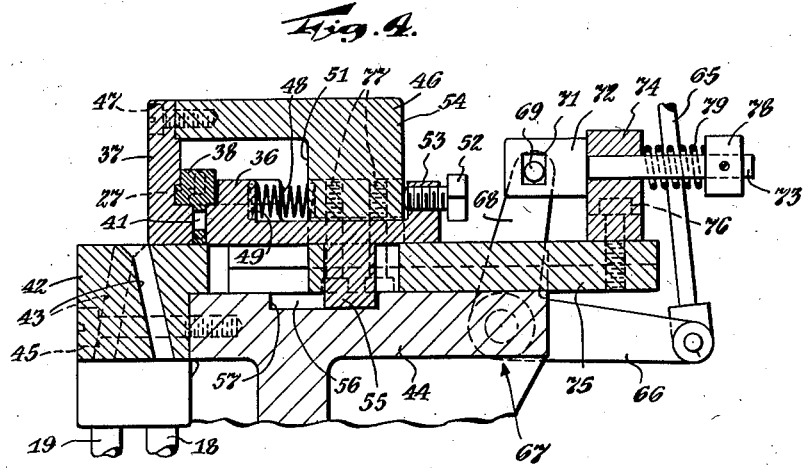
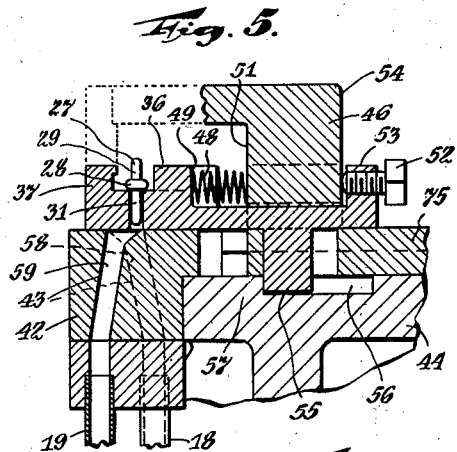
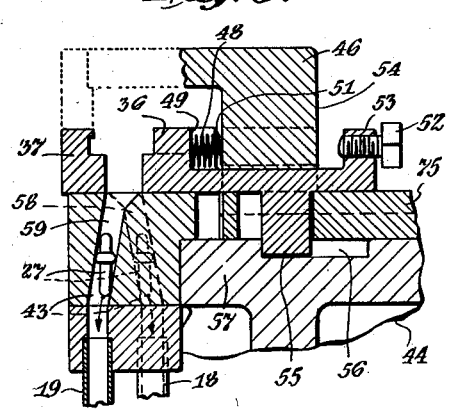
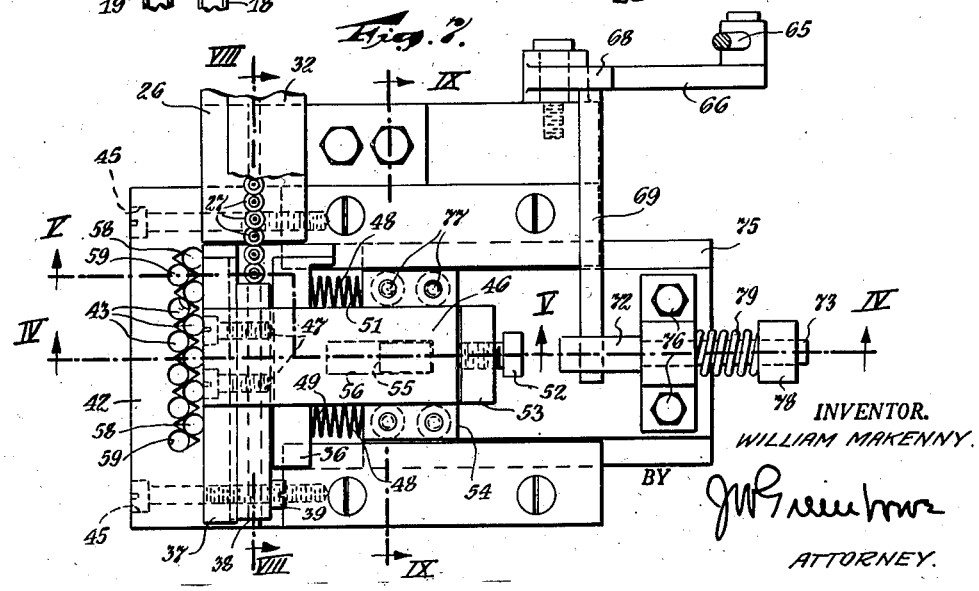
INVENTOR.
WILLIAM MAKENNY.
BY
ATTORNEY.

March 28, 1950

W. MAKENNY 2,502,227

BASE PIN FEED

Filed March 1, 1945

INVENTOR.
WILLIAM MAKENNY
BY J. W. Greenhowe
ATTORNEY.

Patented Mar. 28, 1950

2,502,227

UNITED STATES PATENT OFFICE 2,502,227

BASE PIN FEED

William Makenny, Mountain View, N. J., assignor to Westinghouse Electric Corporation, East Pittsburgh, Pa., a corporation of Pennsylvania Application March 1, 1945, Serial No. 580,472

10 Claims. (Cl. 198—24)

This invention relates to methods and machines for applying contact pins to bases for electrical devices and, more particularly, to an improvement in the feeding of such pins to the machine.

The principal object of my invention, generally considered, is to select a given number of pins used as contacts to be fed to a staking machine for bases of electrical devices, and feed such pins to the heads on said machine simultaneously as they index one by one.

Another object of my invention is to provide a staking machine which has a pin-receiving part made to cut off and take the maximum number of pins to be fed thereto from a runway at any one time, and any number less than the maximum, with a stop so that only the required number to be fed will enter the part, means being provided to move the part across the runway, cutting off the required number from the line of pins, transporting the required distance, and then releasing said cut-off pins to drop through holes to pipes which feed directly to each head on the machine, as it indexes therewith.

A further object of my invention is to provide for feeding pins as predetermined groups to staking machines, delivering a group to each head on the machine as it indexes beneath pipes feeding thereto.

Other objects and advantages of the invention, relating to the particular arrangement and construction of the various parts, will become apparent as the description proceeds.

In the drawing:

Fig. 1 is a plan of the turntable and portions of the associated parts of a staking machine, particularly adapted for applying contact posts or pins to the bases of fluorescent lamps.

Fig. 2 is a fragmentary elevational view of a portion of the machine, part of which is shown in Fig. 1.

Fig. 3 is a fragmentary elevational view of the machine, looking from the right of Fig. 2.

Fig. 4 is a vertical sectional view on the line IV—IV of Fig. 7, in the direction of the arrows.

Fig. 5 is a vertical sectional view on the line V—V of Fig. 7, in the direction of the arrows, but showing the parts in a subsequent position.

Fig. 6 is a vertical sectional view on the line VI—VI of Fig. 10, in the direction of the arrows.

Fig. 7 is a plan of that portion of a staking machine which has to do with the selection and feeding of contact pins to a head of the associated turntable when indexed therebelow.

Figure 8:
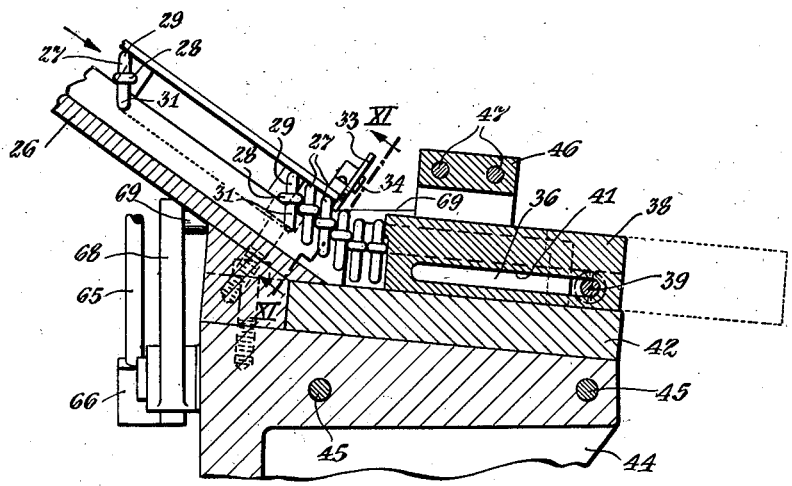
Fig. 8 is a vertical sectional view on the line VIII—VIII of Fig. 7, in the direction of the arrows.
Figure 9:
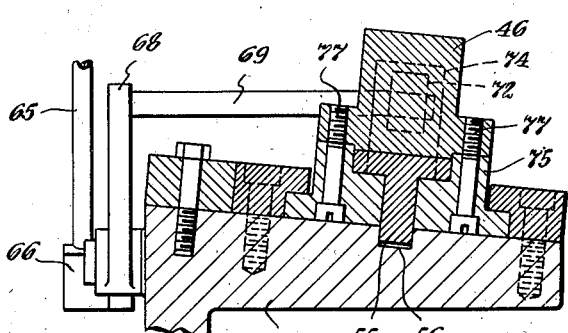
Fig. 9 is a vertical sectional view on the line IX—IX of Fig. 7, in the direction of the arrows.
Figure 10:
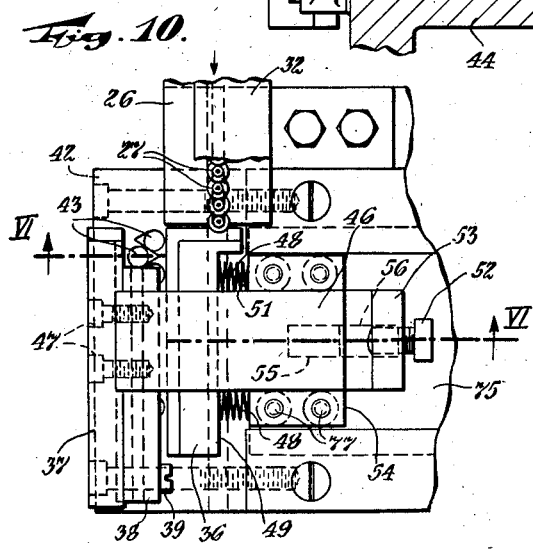
Fig. 10 is a fragmentary plan corresponding to Fig. 7, but illustrating the parts immediately after the release of the pins from between the cut-off and outer runways.

This invention concerns what is generally designated as a staking machine, one embodiment of which is described in the Whitmore et al. application, Ser. No. 344,028, filed July 5, 1940, and entitled "Method and apparatus for counting articles." In said application, there is described how articles, such as radio tube bases, may be counted while going through a staking machine. In said application, however, it was assumed that the pins were fed to the machine in some previously-known manner, Fig. 7 showing pipes for feeding pins or prongs to a head 119 when indexed thereunder.

In accordance with said application, each base has four prongs or contact pins staked thereto. In the present application, I propose to feed contact pins in pairs to bases which may serve for fluorescent lamps. It will be understood, however, that my machine may feed articles otherwise grouped, such as four or other selected number, within the limits allowed for by the length of the cut-off runway and the corresponding number of holes in the cut-off pin block, with which corresponding feeding pipes communicate for placing the selected pins in the apertures of each head as it indexes therebeneath.

Referring to the drawings, there is shown a staking machine, generally designated 12, which comprises a frame like the frame 13 in the referred-to application, in which is journalled a crank shaft like that designated 14 in the previously-referred-to application, causing a ram like that designated 15 in said application, to reciprocate vertically in suitable guides and carrying driving means from a suitable source of power, not shown.

The machine of the present embodiment has a number of plungers operated by the ram, that is, there is a plunger which oils the prongs at the position designated 16 in Fig. 1, after the same have been delivered to a head of the machine in the previous position designated 17, as through pipes 18 and 19 corresponding in number with the number of pins fed to each head.

After the base or shell has been positioned over the pins, after placing the latter in the indexed head, as in the position designated 21 in Fig. 1, such base may be counted in position designated 22, as in the preceding application, preliminarily staked at 23, finally staked at 24, and discharged to a chute or conveyor 25. The details of the pins and staking operations, if for bases to be used on fluorescent lamps, may be in accordance with my application, Ser. No. 516,014, filed December 29, 1943, now Patent No. 2,454,326, granted November 23, 1948, and owned by the assignee of the present application.

The present application relates to the automatic feeding of prongs or contact pins at position 17, and will now be described in detail with reference to the remaining figures. The reference character 26 indicates an inclined runway from a hopper, not shown, which hopper automatically by known means keeps the runway filled with a line of contact pins or prongs 27. Each pin is illustrative of the form in which an intermediate bulge or collar 28 divides its length unequally into a relatively short portion 29 to be staked into a base, and a relatively long portion 31 to project from the lower or outer face of said base for engaging a corresponding socket.

Figure 11:
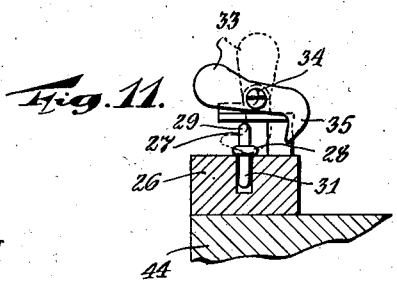
Fig. 11 is a fragmentary sectional view on the line XI—XI of Fig. 8, in the direction of the arrows.

A gage 32 overlies the runway 26 so as to prevent any pins from feeding thereto when in reversed position. A manually operable stop 33, pivoted at 34, is provided for, when desired, holding the line of pins and preventing them from feeding further into the machine, that is, when said stop is moved from the full line to the dotted line position, as shown in Fig. 11, whereby the the hook portion 35 is engaged by the lowermost pin in said runway to prevent it from sliding any further.

The inclined runway 26 feeds the pins by gravity between cooperating movable parts of the automatic pin feed embodying my invention, said parts being a cut-off runway part 36 and an outer runway part 37. Only the desired number of pins is receivable between said parts 36 and 37, said number being predetermined by the setting of the pin stop 38, which is held in place with respect to the outer runway part 37 as by means of a set screw 39, and with the associated parts forms a pin transfer device. In the present embodiment, the stop is set so that only two pins 27 are selected each time the cut-off and outer runways move, but the slot 41 in the stop 38 allows settings of said stop for the accommodation of any selected number of pins up to the capacity of the pin block 42, which in the present embodiment has 12 apertures 43 for simultaneously feeding pins to bases.

The pin block 42 is secured to the frame 44 of the mechanism as by means of bolts, 45, while the outer runway 37 is secured to and movable by the outer runway bracket 46 through bolts 47. The pins 27 which are disposed between the cut-off runway part 36 and the outer runway part 37, are held by their intermediate enlargements 28, like they are held in the inclined runway 26, when the parts are in the position illustrated in Fig. 4 and even after being moved to that of Fig. 5. They are normally held in this position by the coil springs 48 acting between upstanding shoulder 49 on the cut-off runway part 36, and the adjacent face 51 of the bracket 46. Adjustment of the normal spacing between the pin-holding faces of the cut-off runway part 36 and the outer runway part 37 is effected by means of set screw 52, threaded through an outer flange 53 of the cut-off runway part 36, and engaging the outer face 54 of the bracket 46, so that the selected pins are held by their collars 28 without the lower portions being frictionally gripped between the parts 36 and 37.

Movement of the cut-off runway is limited by a depending flange 55 fitting in a corresponding socket 56, with clearance therebeyond just enough to allow for the transfer movement between the inclined file of pins and the off-set position of the apertures 43, so that the selected pins may be moved from the inclined file, through the position of Fig. 5, to the receiving apertures, as illustrated in Fig. 6. The movement of the cut-off runway is for that purpose arrested by the flange 55 engaging the shoulder 57, as seen in Fig. 5, while the outer runway part 37 continues, against the opposition of the springs 48, to the position indicated in Fig. 6, where the selected pins are dropped into the corresponding apertures 58 and 59, from whence they are fed by pipes 18 and 19 to the head 63, which is at that time indexed therebelow.

The runway members 37 and 38 are operated, in synchronism with the movement of the turntable 64 which carries the heads 63, by a connecting rod 65 from a reciprocating part of the machine, the lower end of which rod is pivoted to the lower arm 66 of the bell crank lever 67, the other arm 68 of said lever carrying a generally horizontal operating rod 69 which fits a slot 71 in the head 72 of an operating rod 73, which reciprocates with respect to a bracket 74 connected to the cut-off slide 75, as by means of bolts 76, said cut-off slide being connected to the outer runway bracket 46 as by means of bolts 77. Reciprocation of the rod 73 in the bracket 74 is limited by a stop collar 78 and coil spring 79, which normally keep the head 72 against the bracket 74, as shown in Fig. 4.

In order to insure that the pins which are fed to the pipes 18 and 19 will be received in the appropriate apertures in the indexed head 63, a bridging block 81 is provided which has apertures 82 and 83, forming continuations of the interiors of the pipes 18 and 19, said block being reciprocated in the lower portion 84 of the frame 44, as by means of a connecting rod 85 pivoted thereto as indicated at 86, and operated from a reciprocating part of the machine like the connecting rod 65, so that as the head indexes beneath the pipes 18 and 19, the lower ends of which are clamped in place as by bracket 87 and bolts 88, said block is moved from the full to the dotted line position illustrated in Fig. 2, thereby closing the gap between it and the indexed head 63 at the time the pins are being fed thereto, and insuring that said pins are as intended caught in the corresponding apertures in said head.

The operation of the machine is as follows:

(1) Pins 27 are lined up for gravity feed to the pin group feeding mechanism of the staking machine, as from a hopper which automatically keeps a gravity-feeding inclined runway 26 full of pins.

(2) The pin transferring runway parts, 36 and 37, move back from the position shown in Fig. 6 to that of Fig. 4, when the selected number of pins feed thereto, as illustrated in Fig. 7, from the said inclined runway 26.

(3) The runway parts 36 and 37, or transfer means, move from the position illustrated in Fig. 4 to that of Fig. 5, moving the selected pins laterally from the inclined line thereof to a position over the feeding apertures 58 and 59.

(4) Simultaneously with the lateral transfer of the pins, because of the synchronization between the movements of the parts of the apparatus, including the turntable 64 and the transfer means 36—37, a head such as designated 63 in Fig. 1, is indexed directly beneath the feed pipes 18 and 19 by corresponding movement of said turntable.

(5) During such indexing, the bridging member 81 is moved, from the full line to the dotted line position illustrated in Fig. 2, to bridge the space between the lower ends of the pipes 18 and 19 and the pin-receiving apertures in the head 63.

(6) Continued movement of the cut-off slide 75, after movement of the cut-off runway has been arrested by engagement between the flange 55 and the shoulder 57, removes the pin-supported portion of the outer runway part 37 from that of the cut-off runway part 36, releasing said pins to drop, as illustrated in Fig. 6, into the apertures 58 and 59, from whence they pass to the pipes 18 and 19 for feeding to the indexed head 63.

(7) Continued operation of the mechanism causes the bridging member 81 to be raised, from the dotted line to the full line position illustrated in Fig. 2, to allow the indexed head with its pins projecting thereabove to move to the next position, and the following head to index for the reception of another set of pins.

(8) During the foregoing operation, movement of the mechanism also causes the pin-transferring parts 36 and 37 to first close from the position of Fig. 6 to that of Fig. 5, and then move back to the position of Fig. 4, where a new set of pins is received from the gravity-feeding line thereof, whereupon the foregoing operation is repeated.

Although a preferred embodiment of my invention has been disclosed, it will be understood that modifications may be made within the spirit and scope of the appended claims.

I claim:

1. The method of feeding contact pins for insertion in bases for electrical devices, comprising arranging said pins to feed by gravity in single file, simultaneously receiving from said file only a selected plural number of pins in a transfer device, moving said transfer device until said selected pins are over apertures communicating with feeding pipes to a head movable step-by-step on a staking machine, and simultaneously releasing said selected pins to allow them to fall to position in said head while registered therebeneath so that a base may thereafter be applied thereto.

2. The method of feeding contact pins for insertion in bases for electrical devices, comprising moving said pins in a single file, simultaneously selecting a plural number of compactly grouped pins, moving said selected group laterally of the line of movement of said pins until they are over apertures to feeding pipes communicating with a head movable step-by-step on a staking machine, and simultaneously releasing said selected pins to fall to position in said head while registered therebeneath.

3. The method of inserting contact pins in bases for electrical devices, comprising feeding said pins in line and while in engagement with one another placing only a selected plural number of pins from said line into a transfer device, moving said transfer device until said selected pins are over feeding pipes communicating with a head movable step-by-step on a staking machine, moving a member to bridge the gap between the lower ends of said pipes and said head, and simultaneously releasing said pins from said transfer device to fall to position in said head while registered therebeneath.

4. Apparatus for feeding contact pins for insertion in bases for electrical devices, comprising means for causing said pins to flow in direct engagement with one another by gravity, transfer means adjustable so that it simultaneously receives only a selected number from said engaging flowing pins, means for moving said transfer means, and a plurality of pipes corresponding in number with that of the selected pins and into which said pins are simultaneously delivered upon said transfer means movement.

5. Apparatus for feeding contact pins for insertion in bases for electrical devices, comprising means for moving said pins in single file, transfer means including a stop adjusted to position so that said means receives only a selected number of said pins from said file, means for moving said transfer means, and a plurality of pipes corresponding in number with that of the selected pins and into which said pins are directed upon movement of said transfer means.

6. Apparatus for feeding contact pins for insertion in bases for electrical devices, comprising means for moving said pins while directly engaging one another to said apparatus, transfer means movable transverse to the line of movement of said engaging pins and adjustable to receive only a selected number of said pins on each move, means for moving said transfer means, and a plurality of pipes corresponding in number with that of the selected pins and into which the latter are directed at the end of said transverse movement.

7. Apparatus for feeding contact pins for insertion in bases for electrical devices, comprising means for moving said pins in a single file to said apparatus, transfer means including a cut-off runway part and an outer runway part receiving between them only a selected number of said pins from said moving means, means for moving said transfer means, and a plurality of pipes corresponding in number with that of the selected pins and into which said pins are released at the end of said transfer means movement.

8. Apparatus for feeding contact pins for insertion in bases for electrical devices, comprising, means for supplying pins in single file from a hopper, feed pipes, transfer means movable laterally to said file of pins, said transfer means including a cut-off runway part, an outer runway part, between which parts said pins are received when the latter are in pin-supporting positions, an outer runway pin stop limiting the number of pins received, means for moving said transfer means comprising a connecting rod from a source of power, a bell crank driven by said rod, a cut-off slide, means resiliently connecting said bell crank and slide, means connecting said outer runway stop and slide, spring means disposed between said last-mentioned connecting means and cut-off runway part, and means for stopping the movement of said cut-off runway part when pins carried by said transfer means are in position for discharge, so that said outer runway part is moved by said slide away from said cut-off runway part, allowing said pins to feed through said pipes.

9. Apparatus for feeding contact pins for insertion in bases for electrical devices, comprising means for supplying pins in single file, feed pipes, transfer means movable laterally to said file of pins, said transfer means including a cut-off runway part, an outer runway part, between which parts said pins are received when the latter are in pin-supporting positions, means for moving said transfer means comprising a connecting rod from a source of power, a bell crank driven by said rod, a cut-off slide, means connecting said bell crank and slide, means connecting said outer runway part and slide, spring means disposed between said last-mentioned connecting means and cut-off runway part, and means for stopping the movement of said cut-off runway part when pins carried by said transfer means are in position for discharge, so that said outer runway part is moved by said slide away from said cut-off runway part, allowing said pins to feed through said pipes.

10. Apparatus for feeding contact pins for insertion in bases for electrical devices, comprising means for supplying pins in single file, feed pipes, transfer means including a cut-off runway part, an outer runway part, between which parts said pins are received when the latter are in pin-supporting positions, means for moving said transfer means, and means for stopping the movement of said cut-off runway part when pins carried by said transfer means are in position for discharge, so that said outer runway part is moved by said slide away from said cut-off runway part, releasing said pins to feed through said pipes.

WILLIAM MAKENNY.

REFERENCES CITED

The following references are of record in the file of this patent:

UNITED STATES PATENTS

| Number | Name | Date |
|---|---|---|
| 1,129,882 | McFeely | Mar. 2, 1915 |
| 1,941,992 | Makenny | Jan. 2, 1934 |
| 2,405,074 | Underwood | July 30, 1946 |